Dec. 1, 1925.

N. CARREAU, JR

SPHEROMETER

Filed March 17, 1924

INVENTOR.
NAPOLEON CARREAU JR.
BY
ATTORNEY.

Patented Dec. 1, 1925.

1,563,468

UNITED STATES PATENT OFFICE.

NAPOLÉON CARREAU, JR., OF WICHITA, KANSAS.

SPHEROMETER.

Application filed March 17, 1924. Serial No. 699,760.

*To all whom it may concern:*

Be it known that I, NAPOLÉON CARREAU, Jr., a citizen of the United States, and residing at Wichita, in the county of Sedgwick and State of Kansas, have invented certain new and useful Improvements in Spherometers, of which the following is a specification.

My invention relates to spherometers of the micrometer type.

Heretofore attempts have been made to construct instruments for measuring spherical surfaces in which degree of rotundity was registered, and the reading of such registration exaggerated or enlarged. This effect was accomplished for example by a micrometer screw vertically adjustable in the center of a tripod supported upon three legs. A horizontal disk was fastened to the micrometer screw which was read in conjunction with a vertically disposed vertical linear scale carried by the tripod frame.

In turning such a micrometer screw with the fingers when the legs of the tripod were placed upon the spherical surface, the screw was fed downwardly thereon by the sense of touch until it came in contact with the surface.

I have found by many experiments with an instrument such as described above, that it was quite difficult to get the exact and correct reading.

I have therefore devised an attachment to such class of instruments consisting of compound levers, a swivel, and a scale, by means of which the contact of the micrometer screw and its registration with the sphere is greatly magnified, and at the same time such magnification is shown upon a scale placed in a very convenient position.

One exemplification of my invention is shown in the drawings accompanying this application, in which—

Figure 1:
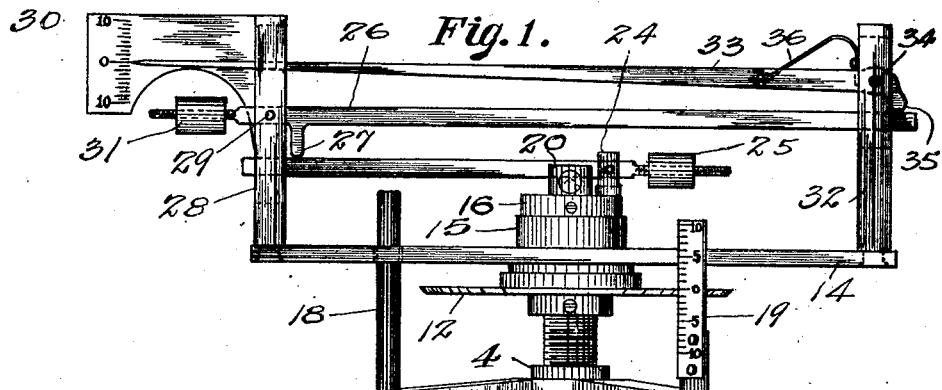
Figure 1 is a side elevation of an instrument to which my invention has been applied.
Figure 3:
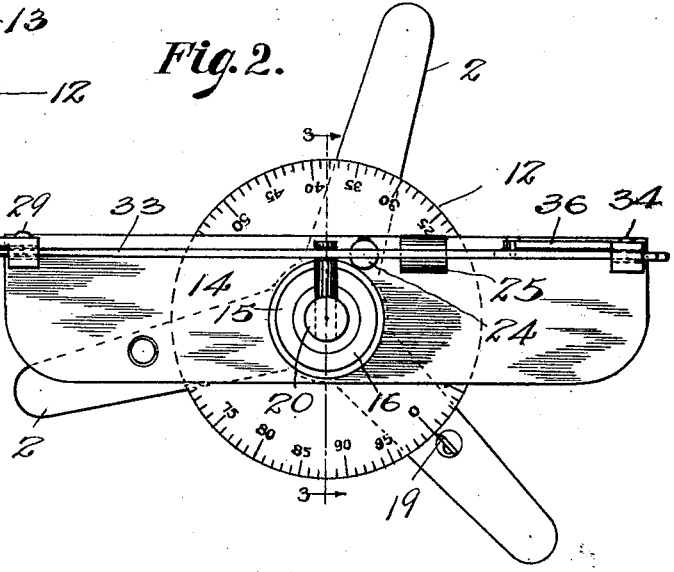
Figure 3 is a detail sectional view of the upper portion of the micrometer screw and its connections leading to the micrometer magnifying apparatus.
Figure 2:
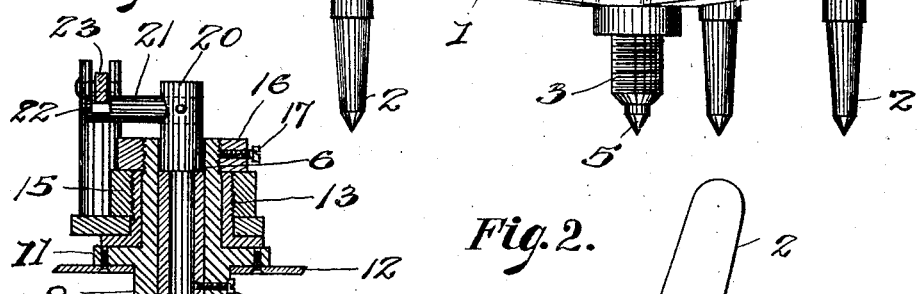
Figure 2 is a plan view of the same.

1 is the tripod supported on the contact legs 2. 3 is the threaded micrometer screw engaging corresponding threads in the vertical opening through the center of the tripod, which may be a bronze bushing 4.

The screw 3 has a central axial opening in which is introduced a floating needle 5 resting on the top of screw 3, the needle being provided with a shoulder 6 for that purpose.

The screw 3 has a shoulder 7 supporting a flange hub 8 held in place by the binding screw 9. Hub 8 has a flange 11 carrying the graduated disk 12 fast thereto.

A flanged bushing 13 surrounds the hub 8 and supports the table 14 firmly clamped to the bushing 13 by the threaded sleeve 15.

To keep the table 14 from lifting the threaded top nut 16 is screwed into the upper end of the hub 8, and when adjusted so that the hub can rotate within the bushing 13, any vertical movement of the nut is prevented by the set screw 17.

This construction permits the screw 3 and hub 8 and its dial disk 12 to rotate without rotating the table 14 and its attachments.

A vertical rod 18 is fastened to the tripod and projects loosely through an opening in the table to prevent the table 14 from turning as it rises and falls.

19 is a vertical graduated scale fastened to the tripod and standing at the outer edge of the annular graduated scale 12. Certain magnified readings may be had from such a scale, depending upon the character of the screw thread, the diameter of the disk scale and its relation to the vertical scale.

My invention aims at producing a greatly increased magnification of the above arrangement and a highly increased sense of touch in registering spherical measurements.

To determine therefore more accurately and sensitively when the floating needle touches the surface of the spherical object I have devised a series of counterbalanced levers actuated by the floating needle 5.

An exemplification of this added magnification is shown by the drawings.

20 is the enlarged upper part of the needle 5 from which projects transversely and radially an arm 21 securely fastened thereto and carrying at its outer end a notched knife edge 22.

23 is a compound lever pivoted to the stud 24 fastened to the table 14. The short end of the lever 23 has a counterbalance 25 adjustable thereon to balance the lever so that it will rest very lightly upon the knife edge 22. The long end of the lever 23 in its oscillation actuates the lever 26.

The lever 26 has a pendant 27 and is pivoted within the slotted standard 28 at 29. This standard 28 is rigidly secured to the table 14.

Forming part of the standard 28 is the graduate scale 30, hereinafter referred to.

The pivoted beam 26 is provided with an adjustable counterbalance 31 similar to counterbalance 25. To the right of its pivot 29 beam 26 bears against the lever 23, through its pendant 27 coming in contact with the long arm of lever 23. The free end of the beam 26 oscillates within a slotted standard 32 also carried by the table 14.

33 is the pointer arm of the scale 30 pivoted at 34 in standard 32.

The long arm of lever 26 moves against the pendant point 35 of pointer arm 33, the free end of which passes up or down before the scale 30.

The scale 30 in this particular exemplification has ten divisions or points to one of the dial 12. In other words scale 30 magnifies scale 12 ten times.

The spring 36 counterbalances pointer arm 33.

My spherometer is capable of measuring and registering .00004 mm. or less than .000002 of an inch.

The field of the invention is not limited to the specific demonstration here given but it may be embodied in other specific forms which come within the scope of my claim.

The invention is capable of measuring surfaces other than spherical.

I claim—

A measuring instrument comprising a plurality of fixed contact members, an adjustable threaded contact member about which the fixed contact members are radially disposed carrying a floating needle having a contact point, and mechanism for magnifying and registering the point of contact.

NAPOLÉON CARREAU, Jr.